United States Patent [19]
Benson et al.

[11] Patent Number: 5,907,566
[45] Date of Patent: May 25, 1999

[54] CONTINUOUS BYTE-STREAM ENCODER/ DECODER USING FREQUENCY INCREASE AND CYCLIC REDUNDANCY CHECK

[75] Inventors: Miles Benson, Hudson; Myles Kimmitt, Shrewsbury; Dan Ater, Newton, all of Mass.

[73] Assignee: 3Com Corporation, Santa Clara, Calif.

[21] Appl. No.: 08/865,246

[22] Filed: May 29, 1997

[51] Int. Cl.⁶ .................................................. G06F 11/00
[52] U.S. Cl. .................. 371/47.1; 371/5.1; 371/20.1; 371/55; 395/850
[58] Field of Search ................... 371/37.01, 5.1, 371/20.1, 47.1; 341/59; 360/40, 49; 370/395, 513; 395/200.57, 200.66, 200.72, 200.81, 872, 888, 891

[56] References Cited

U.S. PATENT DOCUMENTS

| | | | |
|---|---|---|---|
| 4,500,955 | 2/1985 | Chang | 395/888 |
| 4,939,735 | 7/1990 | Fredericks et al. | 371/47.1 |
| 5,177,482 | 1/1993 | Cideciyan et al. | 341/59 |
| 5,299,201 | 3/1994 | Carusone, Jr. et al. | 371/5.1 |
| 5,638,518 | 6/1997 | Malladi | 395/200.81 |

*Primary Examiner*—Emmanuel L. Moise
*Attorney, Agent, or Firm*—McGlew and Tuttle, P.C.

[57] ABSTRACT

A continuous byte stream encoder/decoder process where a continuous stream of ATM data cells is received with a plurality of words, where each word has a plurality of bits in parallel. The ATM data cell is analyzed and new control words are created to convey information such as Start-of-Cell, parity and synchronization signals for the serializer and deserializer chip set. These control words are combined with the data words of the ATM data cell to form a combined word stream. This word stream having a higher word transfer rate than the original ATM data cell. This combined word stream is fed to a known 8B/10B encoder which further modifies the data for proper transmission over an AC coupled serial path. Data from the 8B/10B decoder is then serialized through known serialization/deserialization chip sets passed over the serial path and then deserialized back into an recombined word stream. This word stream is decoded both with a 8B/10B decoder and with a frequency decreasing decoder to restore the data to its original data cell format.

23 Claims, 6 Drawing Sheets

Figure 2  System Block Diagram

Figure 1  Interface Timing

Figure 2  System Block Diagram

Figure 3  Encoder

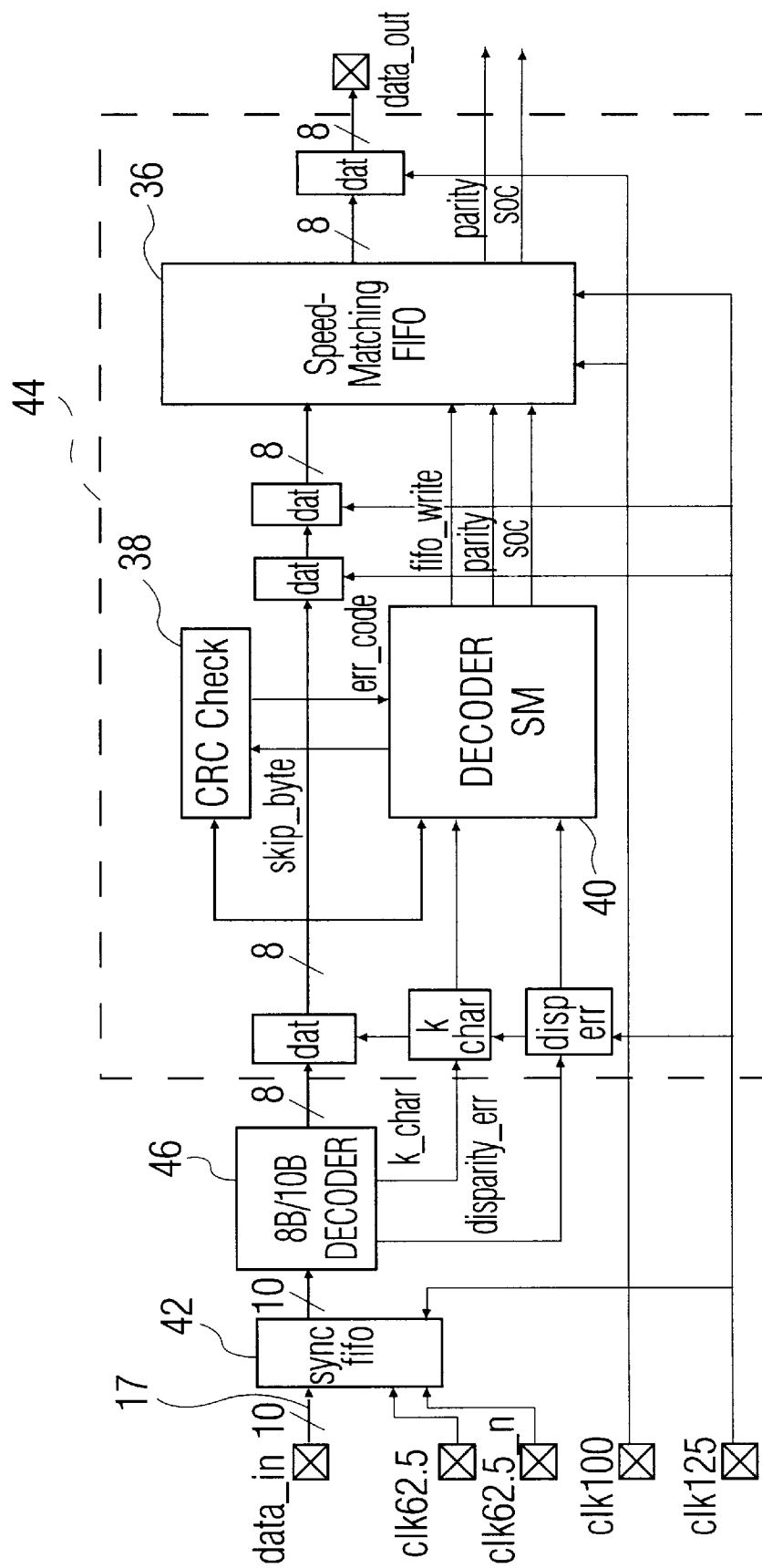
Figure 5 Decoder

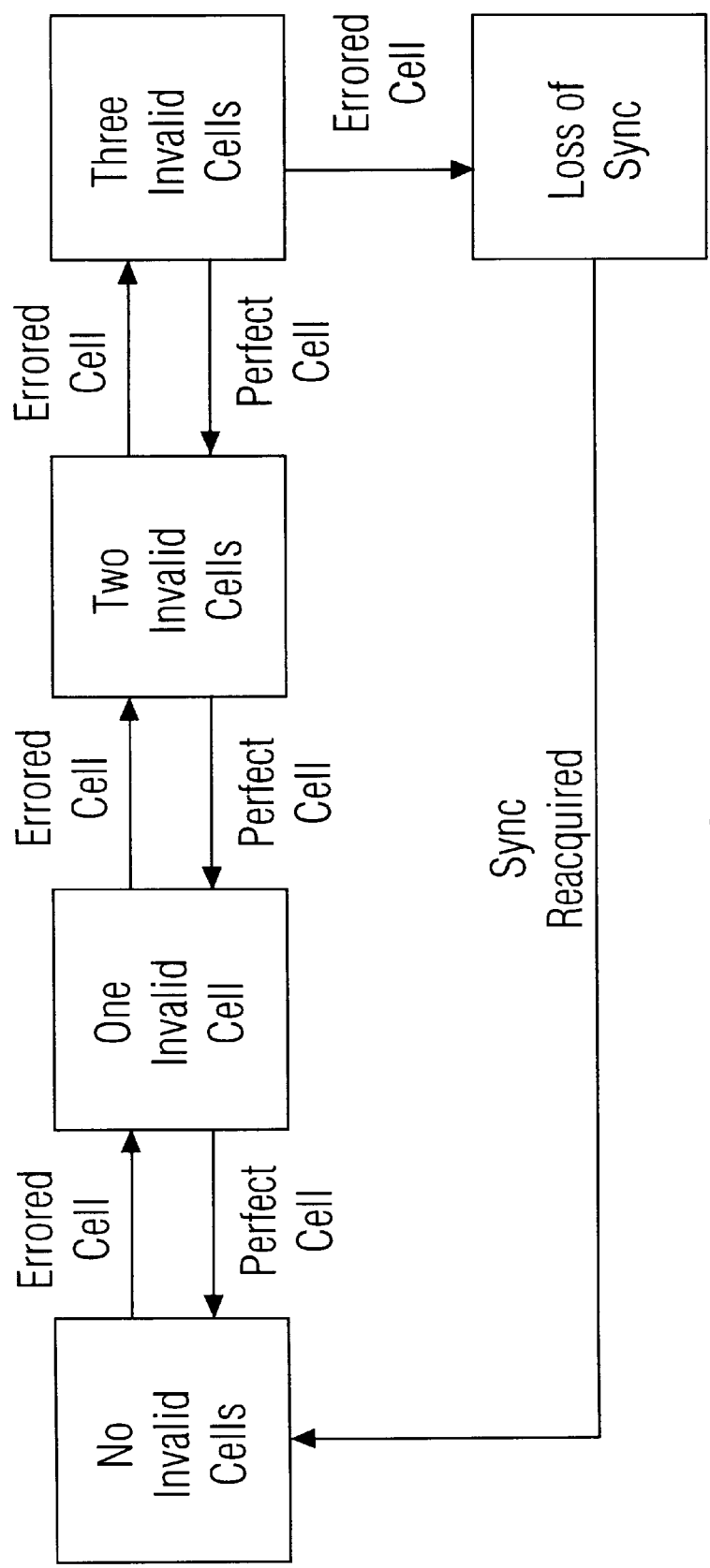
Figure 6  Loss-of-Sync Process

CONTINUOUS BYTE-STREAM ENCODER/ DECODER USING FREQUENCY INCREASE AND CYCLIC REDUNDANCY CHECK

FIELD OF THE INVENTION

The present invention relates to the field of computer data transfer, and in particular to serializing the parallel data from an Asynchronous Transfer Mode (ATM) network on one card of a concentrator, sending the serial data over a serial line on the backplane of the concentrator, and then recombining the serial data into parallel ATM format using known 8B/10B coding and corresponding serialization/deserialization (SERDES) chip sets.

BACKGROUND OF THE INVENTION

A concentrator or hub of a computer Local Area Network (LAN) has a plurality of individual cards or modules. The cards or modules in a concentrator can provide connections to individual workstations, connections to other concentrators or hubs, management functions, control functions and power supplies. The modules or cards are connected by a backplane. Data signals and power are conveyed across the backplane, and each of the cards is connectable to the backplane.

Data is usually transferred across the backplane in parallel. There are a plurality of data paths, with at least one data path for each bit in a word. In this way an entire word can be transmitted across the backplane in a single clock cycle. In ATM networks, data is transferred in cells, where each cell has a plurality of words or bytes. Each word or byte contains a plurality of bits, usually 8. These 8 bits are usually transmitted in parallel over the backplane. Sometimes even the bits of two or four words are transmitted in parallel across the backplane in a single clock cycle. Correspondingly, there must be a line for each of the bits transmitted in parallel.

In an ATM cell, the bits of one word are transmitted or stored in parallel to or in the card, the individual words follow in series.

The individual bits of a data word can also be transmitted serially across a serial line. Some serial lines are AC coupled in order to keep opposite ends of the serial line electrically independent. This requires that the data signal alternate frequently between high and low bits, and that the number of high and low bits be maintained substantially equal.

A known method for transmitting data across an AC coupled serial line, involves the known 8B/10B encoding/decoding mapping copyrighted by IBM in 1983. This 8B/10B encoding or mapping actually takes 8 data bits and one control bit, and converts this into a 10 bit output word. The 10 bit output word is chosen to have sufficient variation in high and low bits to properly convey the data across the AC coupling. The control bit is used to indicate to the 8B/10B encoding when the 8 bit word being received is not a data word, but is instead a word indicating a boundary between words or some other control function.

The 8B/10B encoding also keeps track of the number of high and low bits that have been transmitted across the serial path. When the 8B/10B encoding receives a 9 bit word indicating the control word for a boundary or comma between data words, or a data word itself, the 8B/10B encoding can transmit either a first or second version of the corresponding 10 bit control word. One version (positive) has more high bits than low bits, and the other version (negative) has more low bits than high bits. The 8B/10B encoding selectively uses the first and second versions of the control comma word to maintain an even balance of high and low bits transmitted over the serial path.

Serializing and deserializing circuits are known which receive the 10 bit words from the 8B/10B encoder, and convert these 10 bits into a serial data stream. The deserializer circuit receives the serial data stream and converts the serial data stream back into 10 bit parallel words. Such a serializer and deserializer circuitry is available from the manufacturer AMCC, 6195 Lusk Blvd., San Diego, Calif. 92121, as part number S2052. The deserializer circuit or chip recognizes only one version of the control comma word and uses this one version to synchronize the deserialization process to properly combine the received serial bits into the corresponding parallel data word. The one version of the control comma word indicates where in the serial data stream the data word starts. Not only does this chip only recognize the one version of the control comma word, but this chip expects this control comma word to only appear in certain periodic locations. This deserializer chip or circuitry has been specifically designed for an application where the incoming data stream causes sufficient use of the one version of the control comma word so that the deserializer circuit can maintain synchronous operation. The application also is such that the control comma word is only used at the periodic locations.

In ATM networks, information is sent in the form of individual data cells which contain a plurality of data words. When an ATM data cell is received by a card in a hub or concentrator, it can be processed by an Atlanta chip set interface, namely the ABM-to-ASX interface which has its own corresponding ATM interface format. This ATM interface format consists of 8 bits of data, one bit of parity and one bit of Start-of-Cell (SOC) indication. Once started, data will be sent across this interface in 68-byte portions (53 bytes of ATM cell, plus 15 bytes of overhead), without any gaps between the cells as shown in FIG. 1. This interface format is identical to the format of the ABM (Lucent Technologies LUC4AB01) and ASX (Lucent Technologies LUC4AS01).

SUMMARY AND OBJECTS OF THE INVENTION

It is an object of the invention to receive a data stream in a parallel ATM interface format, send the information over an AC coupled serial data path, and then reconstruct the information from the serial data path back into the parallel ATM interface format. It is also an object of the invention to use encoding/decoding and serialization/deserialization circuitry developed for other applications to reduce costs.

In the present invention, a continuous stream of ATM data cells is received by one module in a hub or concentrator and processed by an interface chip set having an ATM interface format. The information contained in this cell is transferred to another card or module in the concentrator over a backplane on one serial communication path with an AC coupling between the modules.

A known 8B/10B encoding, with a known serializer-deserializer (SERDES) chip set is used to meet the above objectives. However the 8B/10B encoding is only designed for a 9 parallel bit input which requires control words between data words, where the control words indicated the boundaries of the data words.

The present invention receives the ATM format, which is a constant stream of 10 bit words, without any control words indicating boundaries between data words. Also the ATM interface format includes information which indicates the start or boundary between ATM cells.

The present invention is able to achieve its objectives by using the known 8B/10B encoding on the ATM data stream and by increasing the speed of the serial data path to accept additional words other than the ATM words. In particular, the known ATM interface delivers the data words at 100 megahertz. 8B/10B encoding circuitry, and corresponding SERDES chips are known which operate with an input parallel data stream at 125 megahertz. Therefore the present invention uses a frequency increasing encoder to receive the continuous stream of ATM data cells, and increase the frequency to allow adding additional control words. The frequency increasing encoder also analyzes the ATM data cells and uses specific control words to convey information such as boundaries of the individual data words, boundaries of the individual data cells, and to perform error detection functions. The frequency increasing encoder combines the original data words, with additional control words to form a combined word stream at a frequency higher than the frequency of the word stream from the ATM interface and at an available frequency for the 8B/10B encoder circuiting and SERDES chips. The 8B/10B encoder circuitry, in corresponding SERDES chips operate in the known manner on the combined word stream at the higher frequency.

As described previously, 8B/10B encoders and the corresponding SERDES chips are made for specific applications. In particular the SERDES chips according to the present invention were intended to work with an 8B/10B encoding scheme in an application where the incoming data stream has the control comma character only positioned a predetermined periodic locations. If the control comma character or word is not in one of these periodic locations, the SERDES chips will assume that an error has occurred and try to resynchronize the deserialization process. The incoming ATM data stream of the present invention does not contain any control comma words and therefore the frequency increasing encoder must insert the control comma words at proper locations.

The 8B/10B encoding also has two 10 bit versions of the control comma word which it uses to balance the number of high and low bits being sent over the transmission path. The SERDES chips used by the present invention are specifically designed for an application where the positive version of the control comma word is sufficiently used, and therefore the SERDES chips of the present invention only recognize the positive version of the control comma word. The ATM data stream of the present invention has characteristics such that it cannot be guaranteed that the 8B/10B encoding will provide sufficient numbers of positive control comma words for the SERDES chips to properly synchronize. The frequency increasing encoder therefore adds a second type of control word to the combined word stream, to ensure that sufficient numbers of positive control comma words will be formed by the 8B/10B encoding.

In addition to providing additional control words to increase the frequency, and different types of control words, to ensure proper synchronization of the deserialization process, the present invention must add information indicating the start or boundary of the ATM data cells, and information regarding the parity of the data cells. The present invention achieves its objective and provides additional benefits, by calculating a more advanced error detection code for the incoming ATM data cell. A preferred error detection code performs a Cyclic Redundancy Check (CRC). This error detection code is then placed after the last data word of an ATM data cell. The control words are positioned in the combined data stream at periodic control locations. These control locations are chosen so that the word after the last data word in an ATM data cell falls in a control location. However, instead of a control word being inserted into this last location, the error detection code is inserted into this position. In a frequency decreasing decoder which is downstream of the 10B/8B decoder, the frequency decreasing decoder recognizes when a non-control word is not in a control location, and uses this information to indicate the boundaries of the recombined ATM data cells, and also recognizes that the value in this location is the error detecting code. The frequency decreasing decoder then performs an error detection check on the recombined data word, and if the recombined data word passes the error detection check, the parity signal in the recombined data word is set to indicate no errors. If an error is detected in the error detection check, the parity of the recombined data word is set to indicate an error.

If the frequency increasing encoder receives a parity error signal, the frequency increasing encoder will purposely calculate an incorrect error detection code or otherwise have the error detection code indicate an error. The frequency decreasing decoder will then indicate an error and correspondingly set the parity to an error state.

The SERDES chips according to the present invention are only designed for applications that operate at specific frequencies. Therefore, the invention adds a specific number of control words or locations into the combined word stream. The number of control words or locations must exactly increase the frequency of the words stream to known operation frequencies of the SERDES chips. In the present invention, the ATM word stream operates at a frequency of 100 megahertz. The present invention is able to add the proper number of control words or locations, and position the control locations such that control comma words can be added at the periodic locations required for synchronizing the deserialization process. The number and locations of the control words also allows the adding of the second type of control word to ensure that the proper number of positive control comma words are created by the 8B/10B encoding, that a control location falls after the last data word of the data cell and that the corresponding frequency increase exactly matches an existing SERDES chip set. In particular the present invention is able to operate with a SERDES chip set that runs at 125 megahertz.

The portion of the combined data stream which contains all of the control characters and data words of an ATM data cell, is called a frame. Because of the number of data words in an ATM cell, and the number of control words needed, the periodic locations required for synchronization will not always fall in the same position with regard to the control locations in a data cell or frame in the combined word stream. Due to the varying location of the synchronizing periodic locations with the control locations, the present invention has designated even and odd frames. In an even frame, the first and last control location is a synchronizing periodic location. In an odd frame, the first and last control locations are not synchronizing periodic locations. When odd and even frames alternate, the control comma character placed in the synchronizing period locations are properly positioned for the deserialization process of the SERDES chip.

When the cell size is of a different length, especially an even multiple of 8 bytes, the periodic locations fall in the same location in each frame, and therefore the present invention can operate without the feature of odd and even frames.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a block diagram of the decoder;

FIG. 6 is a flow chart of the Loss-of-Sync process.

DETAILED DESCRIPTION OF THE PREFERRED EMBODIMENT

Figure 1:
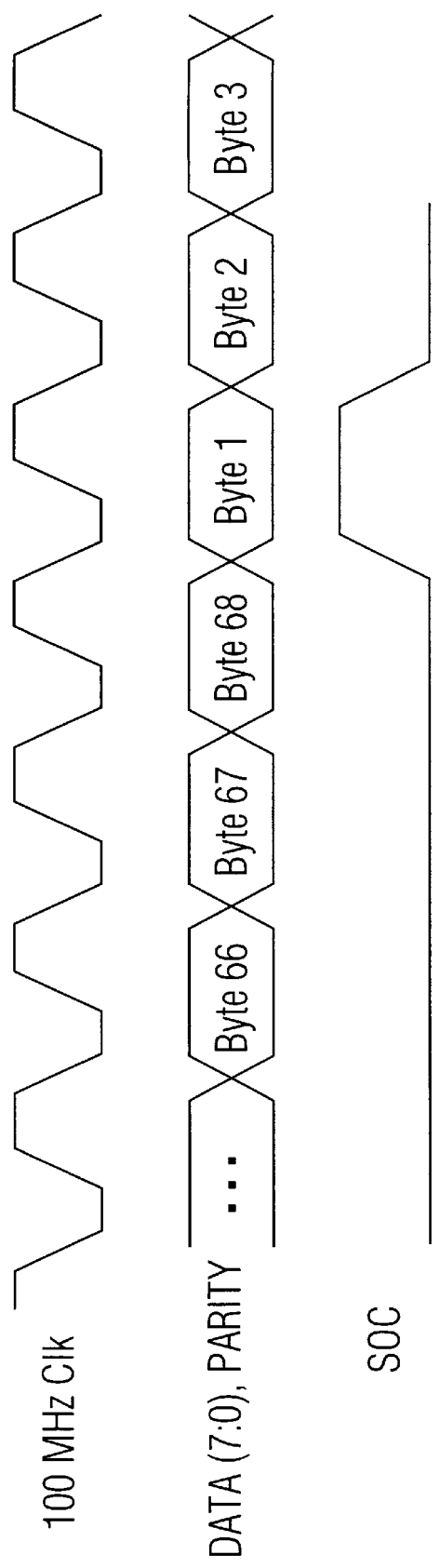
FIG. 1 is a timing diagram of the ATM interface of the present invention.

Referring to the figures, especially FIG. 1, the format of the ATM data which is received by the present invention is in a format compatible with an Atlanta chip set interface, namely the ABM-to-ASX interface. This interface consists of 8 bits of data, one bit of parity and a one-bit Start-of-Cell indication (SOC). Once started, the data will be received from an ATM interface in 68-byte cells, 53 bytes of the ATM cell, plus 15 bytes of overhead, without any gaps between the cells as shown in FIG. 1. The 10 bits of information comprising the ATM interface format (data, parity and SOC) must be conveyed to known serialization/deserialization chip sets. The 10 bits of ATM interface format cannot be directly sent to the SERDES chips, due to several requirements of the serial data path.

The serial data path of the present invention includes an AC coupling and a DC bias which can build up if the data stream is too heavily weighed towards the transmission of all high or low bits, also known as ones and zeros. Thus there is a requirement on the serial path that on average a similar number of high and low bits are sent. Also an AC coupling must have sufficient variation between high and low bits to operate. Therefore a long string of high bits or low bits must be prevented.

Figure 2:
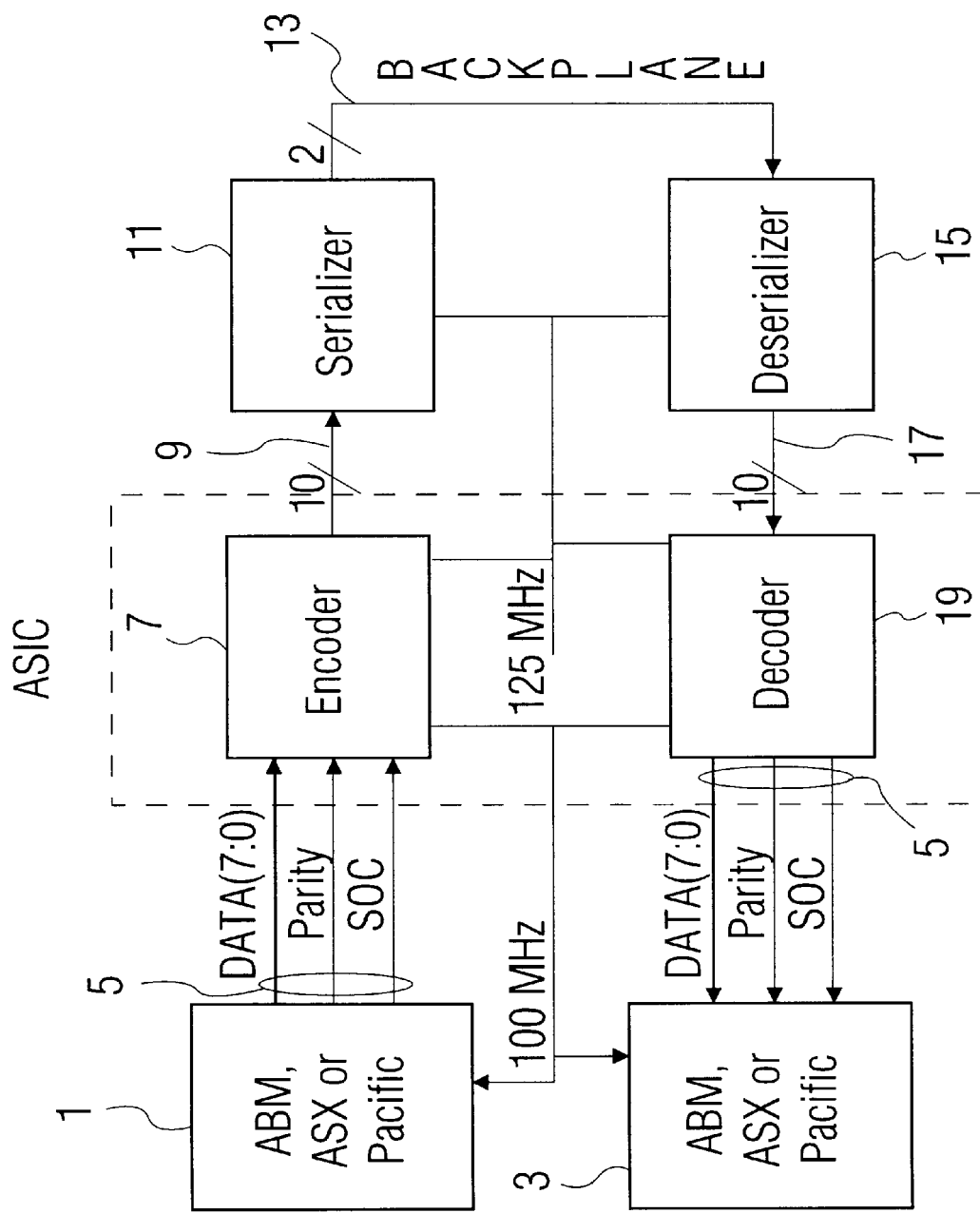
FIG. 2 is a block diagram of the present invention.

FIG. 2 is a block diagram of the system of the present invention. In particular FIG. 2 shows the block diagram of the environment on one card in a hub or concentrator. Similar cards in the hub or concentrator have similar environments and are also connected to a backplane. Since two way communication is desirable between the cards on the backplane, each card includes structure for sending and receiving the serial data.

In particular a transmitting ATM interface 1 sends out an ATM word stream 5 consisting of 8 bits of data, one bit of parity and one Start-of-Cell bit. This is received by the encoder 7 which performs the proper processing to create a combined word stream 9 which is received by a serializer 11. In the serializer 11, the combined word stream 9, which was parallel, is converted into a serial data stream and is transmitted over a serial data path 13. The serial data path is in the backplane of the concentrator and any other card in the concentrator connected to the serial data path can receive the ATM information.

When the card in FIG. 2, wishes to receive ATM data cell information from the backplane, a deserializer 15 receives the serial data stream from the backplane serial path 13 and recombines the serial data stream into a parallel recombined word stream 17. The serializer 11 and the deserializer 15 are known from other applications as a SERDES chip set and are available from the manufacture AMCC, 6195 Lusk Blvd., San Diego, Calif. 92121 as part number S2052. These SERDES chip sets have particular characteristics, for their own applications, as will be described later. The recombined word stream 17 is received by the decoder 19 and put back into the ATM data format 5 where a receiving ATM interface 3 receives the ATM word stream 5 for continuous processing in the known manner for ATM data.

The SERDES chip set 11, 15 used according to the invention is designed for use in an application where control words were included in the data stream, and in particular where a control comma word is used to indicate the boundaries between data words. The deserializer 15 recognizes the presence of this control comma word and uses its presence to properly combine the bits from the serial data path 13 into the parallel words on the recombined word stream 17. These SERDES chip sets require that the control comma word only be received at synchronizing periodic locations in the combined word stream 9. If a control comma word or character is detected in a non-synchronizing periodic location, the deserializer 15 will assume that an error has occurred and it will try to resynchronize. Therefore, the encoder 7 of the present invention must combine control comma characters with the data words of the ATM word stream 5, at proper synchronizing periodic locations in the combined word stream 9. The ATM word stream format 5 interfaces with ABM and ASX chips, in addition to the Atlanta chip set.

Figure 3:
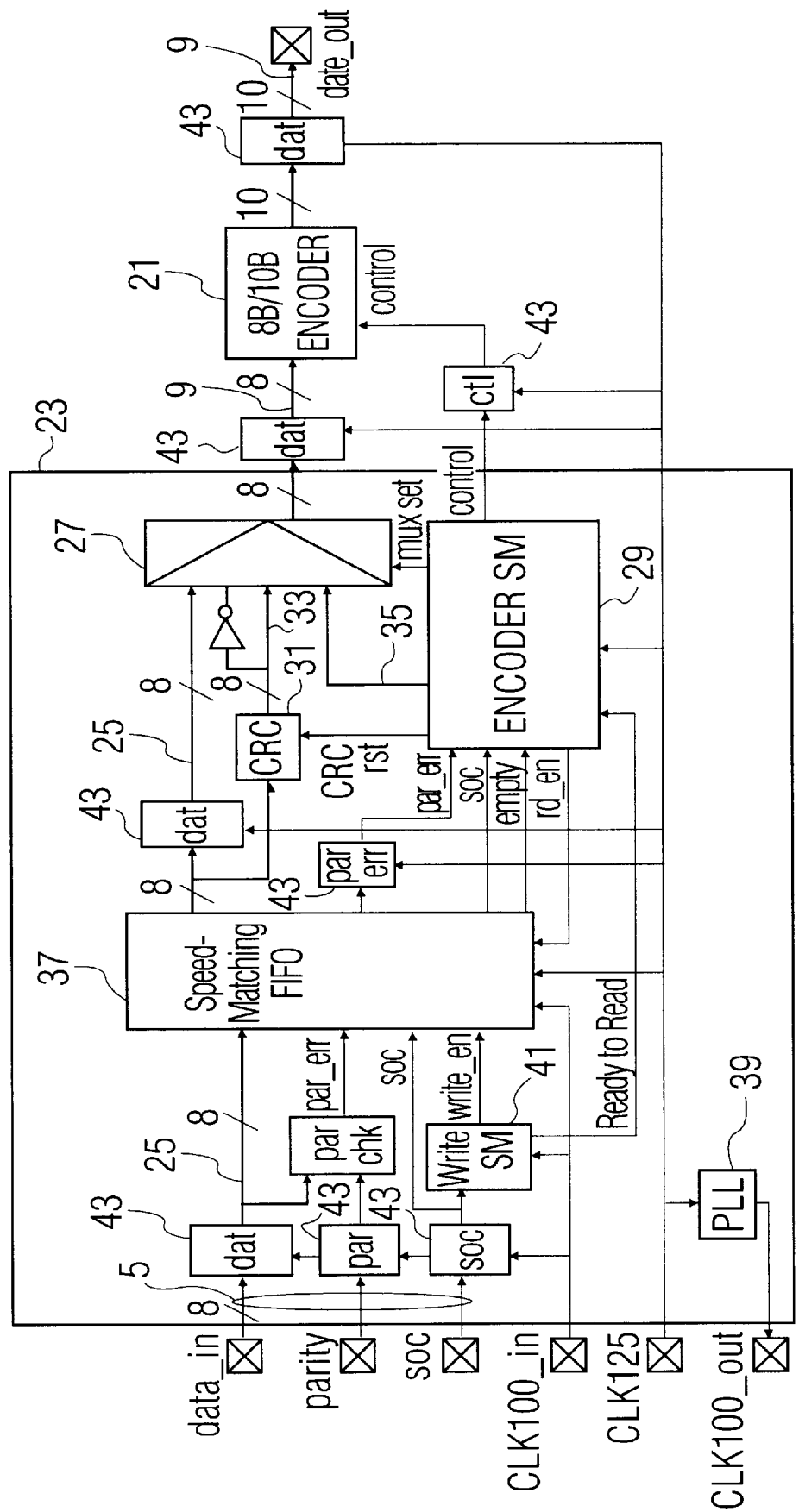
FIG. 3 is a block diagram of the encoder.

Because of the AC coupling in the serial path 13, which requires a substantially balanced amount of high and low bits, as well as sufficient variations between the high and low bits, a 8B/10B encoding or encoder 21 is incorporated into the encoder 7, as shown in FIG. 3. FIG. 3 is a block diagram of the encoder 7 of FIG. 2. This 8B/10B encoder 21 receives 8 bits, or 9 bits if the control bit is included, and converts these incoming bits into a 10 bit word that has sufficient variations between high and low bits for an AC coupling. The 8B/10B encoder also has two different versions of a 10 bit control comma character. The 8B/10B encoder keeps track of the balance between high and low bits, and uses positive and negative versions of the control comma word to adjust the balance between high and low bits. The SERDES chips used according to the invention only recognize one version of the control comma word, usually the positive version. The applications for which the SERDES chips were designed were such that a sufficient number of positive control comma words would be present for proper synchronizing of the deserializer 15.

Also the 8B/10B encoder 21 is designed to receive the control comma word in the actual data stream, and is not designed to have to translate an additional parity error signal and/or Start-of-Cell signal. This information must also be included into the data stream in a manner acceptable to the 8B/10B encoder 21 and the SERDES chips 11, 15.

The information from ATM format 5 is converted to combine word stream 9 by incorporating a frequency increasing encoder 23 upstream of the 8B/10B encoder 21. This frequency increasing encoder 23 receives the ATM word stream 5 at a first rate, and adds control words and an error detection code to increase the number of words and increase the frequency of the combined word stream 9. In particular the ATM data words 25 are fed to a multiplexer 27. An encoder state machine 29 delivers control words to the multiplexer 27. An error detection means 31, preferably a CRC, calculates an error detection code from the ATM data words 25 and this error detection code 33 is also sent to the multiplexer 27.

The encoder state machine controls the multiplexer 27 so that the ATM data words 25, the error detection code 33 and the control words 35 are properly combined by the multiplexer 27 into the combined word stream 9. Here the combined word stream 9 is 8 bits in parallel, or 9 bits if the control bit is considered. The 8B/10B encoder 21 then converts these bits into a 10 bit combined data word stream 9 where it is received by the serializer 11. Speed coordination between the ATM word stream 5, and the operation of the multiplexer 27 are controlled by the speed matching FIFO 37, the phase lock loop (PLL) 39 and the write state machine 41. Various data buffers 43 are also used to properly coordinate the data transfer inside the encoder 7.

The left side of FIG. 3 shows the ATM interface which is synchronous to the 100 megahertz clock input and the positive phase of a differential TTL clock provided by the ATM interface. The preferred speed of the combined data stream 9 is 125 megahertz and this is created on the card. The 125 megahertz clock is divided by 5 and multiplied by 4 within the encoder of the present invention to create the 100 megahertz clock output. This will be driven back to the ATM interface which will create the differential TTL clock mentioned above. A parity check is done on the ATM word stream 5 and any error signal is then forwarded. All data, parity error and SOC indications will then enter the speed matching FIFO 37 at 100 megahertz, which will increase the speed to 125 megahertz. The write state machine 41 will handle starting the FIFO write process when it sees a proper SOC pattern, and will generate a ready-to-read signal synchronous to the 125 megahertz clock. The encoder state machine 29 will start upon seeing the ready-to-read signal, and from that point on it will perpetuate a pattern of reading four bytes from the FIFO, and inserting the proper single overhead byte into the data stream. At the end of a cell, the encoder state machine 29 will insert the CRC value or the error detection code 33 if a parity error has been seen during the course of the cell. The encoder state machine 29 will do all of this by controlling the multiplexer 27 through the mux sel signal line as shown. Once both state machines have started, the speed matching FIFO 37 should not overflow or underflow, unless an error condition occurs, because the 125 megahertz and 100 megahertz clocks are in frequency lock, and derived from the same source.

The output of the multiplexer 27 enters the 8B/10B encoder 21. The 8B/10B encoder 21 converts the 9 bit data stream, 8 bits plus a control signal indicating whether a data character or control character is desired, into the appropriate 10 bit symbols, keeping track of the current running disparity with regard to high and low bits. This combined word stream 9 then leaves the encoder 7 and enters the serializer side of the SERDES. This side of the SERDES is driven by the same 125 megahertz clock that drives the encoder 7.

Figure 4:
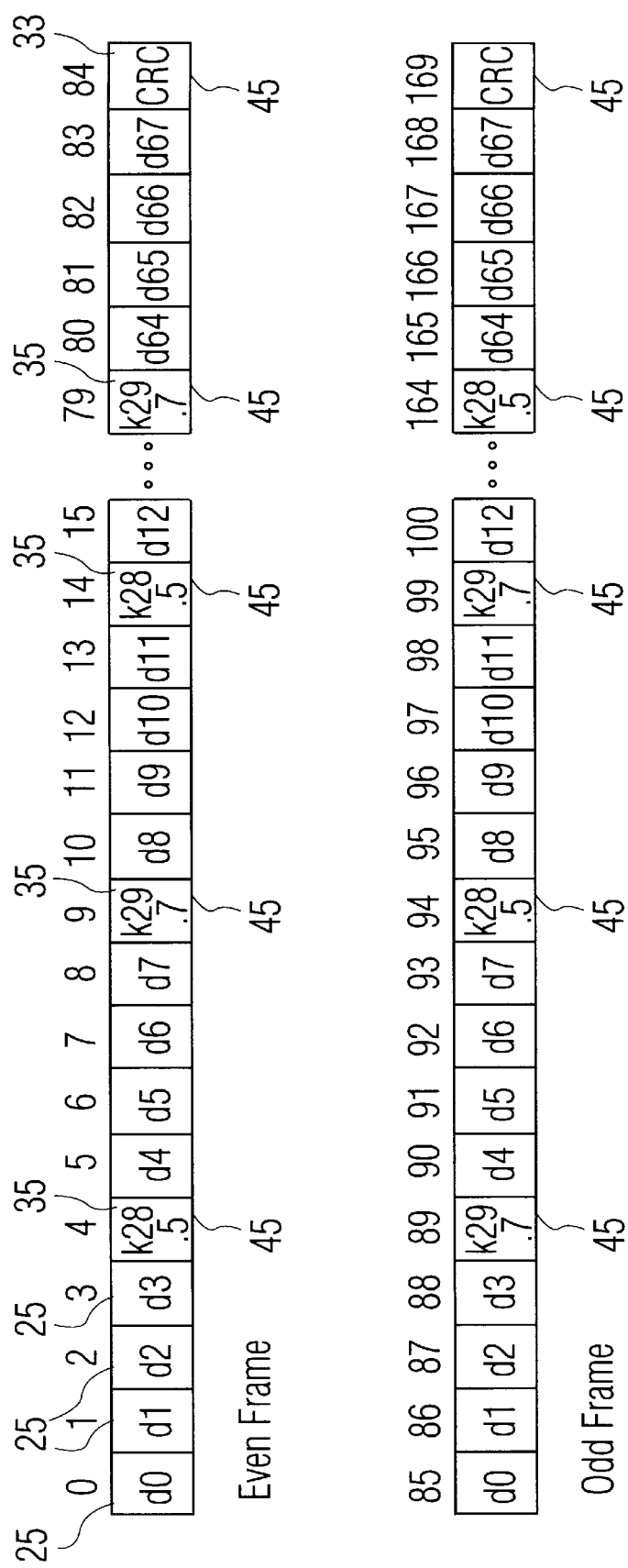
FIG. 4 is a diagram of the frames in the combined word stream.

All the ATM data words, the corresponding control words, and the error detection code for a single ATM data cell are positioned adjacent to each other in a frame of the combined word stream 9. FIG. 4 shows two frames of a combined word stream 9. The boxes having reference characters D0–D67 represent ATM data words, and the boxes having reference characters K28.5 and K29.7 are control words 35. The box having reference character CRC contains the error detection code 33. The K28.5 control word is the control comma character that is used by the SERDES chip set to synchronize the deserializing of the serial data stream. The deserializer of the present invention requires that the control comma character be in synchronizing period locations, which in the present invention are the evenly numbered locations. In the even frame of FIG. 4, the K28.5 character word is in the 4th and 14th locations. If the even frame was fully extended, the K28.5 character word would also be in the 24th, 34th, 54th etc. positions. As described earlier, the 8B/10B encoder uses a positive and negative version of the control comma word to maintain a balance of high and low bits. The SERDES chips only recognize the positive version of a control comma word and therefore additional control words K29.7 are added to cause the 8B/10B encoder to generate a sufficient number of positive control comma words which would be required for proper synchronizing of the deserializer. The K29.7 control word is neutral in that it has the exact same number of high bits as low bits. The K29.7 control word is inserted into those control locations that cannot take a control comma word since those control locations are not synchronizing period locations.

Further the control locations 45 are set up in a pattern so that a control location 45 is to be positioned right after the last ATM data word in a cell or frame. However, instead of this control location including a K28.5 or a K29.7 control word, this last control location of a frame contains the error detecting code 33. When it is time to reconstruct the ATM data cell, from the recombined word stream 17, the absence of a control word in a control location 45 indicates the boundaries of the ATM data cell or frame. The frequency decreasing decoder which reconstructs the data cell then knows that the value in this location is an error detection code and marks the boundary of an ATM cell. The frequency decreasing decoder reconstructs the ATM cell based on this boundary, and checks to determine if an error has occurred during transmission.

The SERDES chips are only designed to operate at certain frequencies. Therefore the number of control words per data cell, and the control locations 45 needed to be chosen such that the frequency increase would be to an operating speed of a known SERDES chip, be able to correspond with the synchronizing period locations required by the SERDES chip, and to have a control location correspond with the last location in a frame so that the absence of a control word and the inclusion of an error detection code 33 can signal the boundaries of a data cell, and also convey information regarding an error in transmission.

The present invention has found that an acceptable combination in a preferred embodiment is to have a control location 45 in every fifth word of the combined word stream with the other locations containing the ATM data words. Also the control words 35 alternate between the K28.5 character, containing a comma, and the K29.7 character or word. The SERDES chip requires that it receive the comma word periodically so that the SERDES chip can acquire byte sync. Also the SERDES chip requires that these commas only occur on even number bytes which is a characteristic do to the half frequency, bi-phase receive clocks required by the SERDES chips. Plus the K29.7 control word is sent in every control location 45 that would be an odd numbered byte. The 8B/10B encoder calculates a running disparity which tracks the number of high and low bits sent. The running disparity is kept to track whether at the present time, more high or low bits have been sent at the end of a particular byte. The running disparity can either be minus one or plus one. At the end of a particular byte, if more high or ones have been sent than lows or zeros, the disparity is plus one, and if more lows or zeros have been sent than ones or highs, the disparity is minus one. The K29.7 control word will always keep the disparity the same as it was before it was transmitted. This is necessary, because the K28.5 will always flip the disparity from what it was before it was transmitted. The combination of these two guarantees that no repetitive bit pattern can cause the K28.5 to always align with the positive disparity and therefore always cause a negative control comma word to be sent by the 8B/10B encoder. However, an occasional negative control comma word will be sent, but it will not be often enough to cause the SERDES chip to loose synchronization. For a more detailed description of running disparity reference is made to known applications.

Because of the number of data words, the first and last control locations 45 will either be an even location or an odd location when the frames are transmitted one after another. Those frames that have the first and last control locations being even are called even frames, and the frames of the first and last control locations are odd are called odd frames. The frequency increasing encoder 23 is designed to create even and odd frames alternately, in order to have the control comma word properly be aligned in the synchronizing period locations.

The error detection means 31 preferably performs a Cyclic Redundancy Check for error detection. The preferred generator polynomial used for the CRC is $X^8+X2+X+1$. This mechanism allows a possibility that a bit error in a certain cell will be propagated and not detected until the next cell. In this case both cells in the present invention are declared to contain errors.

The frequency increasing encoder 23 also performs a parity check between the data words received from the ATM interface, and the parity bit. Parity check is a type of error detection. If the frequency increasing encoder 23 determines that there is a parity error on the received data, the error detection code is modified so that when the serial data stream is recombined, the frequency decreasing decoder will also indicate a parity error.

In the preferred embodiment, any parity errors that the frequency increasing encoder receives during a particular cell will be indicated by forcing a bad CRC on that cell (inverting every bit of the CRC). Note that the information of exactly which byte of the cell was corrupted is lost. CRC errors detected by the frequency decreasing decoder, caused by either a parity or coming from the ATM interface or by a transmission error on the serial path are signaled to the receiving ATM interface by forcing a bad parity on data word D63 of the cell. Since received parity errors in D64–D67 are not sensed by the receiving ATM interface, the parity error must be indicated earlier on D63.

FIG. 5 is a block diagram of the decoder 19. The decoder 19 contains an 8B/10B decoder 46 which performs substantially the opposite function as the 8B/10B encoder 21. Downstream of the 8B/10B decoder 46 is the frequency decreasing decoder 44. This operates for the most part to undo the encoding formed by the frequency increasing encoder 23. The 125 megahertz clock is the same used by the frequency increasing encoder 23, which is created on the same board or card. Since the 125 megahertz clock is created on every board from the same source, there is a guaranteed frequency relationship between the 125 megahertz clocks on all the different boards or cards. Thus, certain assumptions can be made when transferring between the 62.5 megahertz recovery clock and the 125 megahertz clock. In particular, it is known that there would be in frequency lock, which will ensure that no FIFO overrun or underrun situations occur due to frequency variations. The recombined word stream 17 is received from the deserializer 15 in a parallel stream which is 10 bits wide. The 10 bit wide recombined word stream enters the synchronizing FIFO 42 which takes in bi-phase 62.5 megahertz clock data and delivers data synchronous to the 125 megahertz clock. The data then enters the 8B/10B decoder 46 which translates the data into a 9 bit data stream (8 bits of data and one control bit to indicate whether the current signal is a K character).

The decoder state machine 40 performs many functions. The decoder state machine 40 first synchronizes with the incoming bit stream and determines the delineation between the cells when the link first comes up, or when the link looses synchronization. The decoder state machine synchronizes by first looking for the K28.5 control comma word. This can be of either the positive or negative version/disparity. The SERDES chips align on byte boundaries. Such a function is known and therefore not included in the present description of the invention. Once a K28.5 control word is found, the decoder state machine verifies that every fifth bit after the found K28.5 control alternates between K29.7 and K28.5, until a non-control character is found in a control location. At this point the decoder state machine assumes that the end of cell has been found and a start of cell position can be assumed. From this point on the decoder state machine 40 will be continually verifying that K29.7 and K28.5 control words alternate every five byte positions, and that the 17th control location in a frame is not a control word. The decoder state machine will also verify that every non-control location is a data character and that there are no disparity errors. Once three of these good cells have been seen in a row, synchronization will have been determined to be established. If a non-expected event occurs, including a disparity error but not including a CRC error, the process will once again start from the beginning.

The decoder state machine 40 must also determine when synchronization has been lost and attempt to reacquire. FIG. 6 shows a top level diagram of the loss of sync process. Once synchronization has been gained, the bit stream will continue to be checked for exact adherence to the cell format. For every format or disparity error that is seen (such as a control word in the wrong place, etc.), the decoder state machine will increment a counter. If an intermittent good cell is seen, the counter will be decremented. Upon the counter reaching a count of three, the decoder state machine will be considered to reach a state of loss of synchronization. If a good cell is seen after an error cell, the machine will slip more towards being in synchronization. As soon as the loss of synchronization state is reached, link synchronization will be assumed to have been lost, and decoder state machine 40 will go back to attempted to acquire synchronization. Until the loss of synchronization state is reached, all cell boundaries are assumed to be as they were before errors started to be detected. Note that four error cells in a row will cause the loss of synch state to be entered, and that multiple errors in a single cell will only be counted once.

Once a synchronization is acquired, the decoder state machine 40 must indicate to the CRC checker 38 which bytes to include in its calculation. The CRC checker skips a byte or word every time a control character or control location is received.

Upon detection of the CRC error, an erred parity indication is delivered to the receiving ATM interface. This indication however must be coincident with byte or word 63 of the cell. Since this information is not known until one byte after the end of the cell (six bytes later), pipe line stages are added to the data path to allow for this.

If a running disparity error, or a control word character, is detected in a non-control location, the decoder state machine 40 will assert the parity error signal to the receiving ATM interface on the byte corresponding to where the running disparity error was detected. Note that it is possible for a bit error to occur in the serial stream, and resulting disparity error to be detected many byte times later. Thus, it is possible for the detection to actually occur in the cell following the one that actually contained the error. This will result in both cells being marked as bad. The cell actually containing the error will have a bad CRC, and the following cell would be marked with the bad running disparity.

If a running disparity error or data word is detected in a control location, anywhere but the CRC, the decoder state machine cannot inject a parity error during this byte time to the receiving ATM interface, since this byte does not get through the decoder FIFO 36. Instead, it will save the information that an error occurred, and assert a parity error during byte 63 of the cell, just as was done in the case of a CRC error. If a running disparity error, or a control character, is detected on the last control location, a parity error will be forced during byte 63 of the cell. In other words this is treated just like a CRC error. The decoder state machine will also indicate to the receiving ATM interface when a SOC happens. Once the machine is synchronized to the cell boundary, the SOC signal is generated at the appropriate time. Once the above functions are performed, the data, Start-of-Cell and parity would be read into the stream matching FIFO 36 on the 125 megahertz side. All data bits would be written into the FIFO 36 and the control words will be dropped (FIFO write enable not asserted). This will allow the read side of the FIFO 36 to access the data at a 100 megahertz rate and guarantee a continuous stream, without overflows or underflows. As such, ATM data cells are delivered to the receiving ATM interface and the serialization path across the backplane of a concentrator is transparent to the ATM interfaces.

While specific embodiments of the invention have been shown and described in detail to illustrate the application of the principles of the invention, it will be understood that the invention may be embodied otherwise without departing from such principles.

What is claimed is:

1. A continuous byte stream encoder/decoder process in an ATM (Asynchronous Transfer Mode) network, the process comprising:

providing a network concentrator with a plurality of ATM cards and a backplane with a serial line;

receiving a continuous stream of ATM data cells on one of said ATM cards, each of said data cells including a plurality of data words received at a first rate, each of said plurality of data words including a number of bits in parallel;

creating a plurality of control words each representing characteristics of one of said data cells, each of said plurality of control words including a plurality of bits in parallel;

combining said control words and data words into a combined word stream at a second rate higher than said first rate;

converting said plurality of parallel bits of said combined word stream into a serial stream of bits;

transmitting said serial stream of bits at a serial rate over said serial line;

receiving said serial stream of bits from said serial line by another of said ATM cards;

converting said serial stream of bits back into respective said control and data words using said control words to identify boundaries of said data words;

recombining said data words from said serial stream of bits back into respective said data cells using a location of said control words.

2. A process in accordance with claim 1, further comprising:

transmitting out said recombined data words in a respective cell at said first rate;

said serial rate transmitting more bits per unit time than said first rate.

3. A process in accordance with claim 1, further comprising:

encoding said data words prior to said converting into said serial stream by using an 8-bit to 10 bit encoding scheme.

4. A process in accordance with claim 1, wherein:

said data cells and said data words are received immediately one after the other;

an out-of-band signal is received in addition to said stream of data cells;

said creating of said control words uses information from said out-of-band signal.

5. A process in accordance with claim 4, wherein:

said out-of-band signal includes information regarding boundaries and parity of each of said data cells.

6. A process in accordance with claim 5, further comprising:

determining an error correction code for one of said data cells;

reading said parity of said one data cell and corrupting said error correction code if said parity indicates an error;

inserting said error correction code in said combined word stream at said one ATM card;

retrieving said error correction code from said serial stream at said another ATM card;

determining from said retrieved error correction code if said one data cell has been corrupted.

7. A process in accordance with claim 4, wherein:

said out-of-band signal indicates parity error for a respective data cell;

an error detection code is merged with said combined data and control words to determine data integrity, said error detection code indicating an error when said out-of-band signal indicates a parity error.

8. A process in accordance with claim 1, wherein:

said combining of said control words and data words includes placing a first type control word only at periodic locations in said combined word stream;

said converting of said serial stream of bits includes a deserial process which only uses said first type control word to determine boundaries of said data words.

9. A process in accordance with claim 8, further comprising:

encoding said data and control words prior to said converting into said serial stream, said encoding having a first and second version of said first type control word, said encoding using said first and second versions of said first type control word to maintain an even balance of high and low bits transmitted over said serial line;

said combining of said control and data words placing a second type control word in said combine word stream to cause said encoding to sufficiently use said first version of said first control word for said converting of said serial stream to determine said boundaries.

10. A process in accordance with claim 9, wherein:

said encoding places said second type control word halfway between said periodic locations.

11. A process in accordance with claim 8, wherein:

said combining places an error detection code in said combined word stream to determine data integrity;

said error detection code is placed in said periodic locations.

12. A process in accordance with claim 11, wherein:

said error detection code is placed between said data cells in said combined word stream.

13. A process in accordance with claim 8, wherein:

boundaries of said data cells correspond to said periodic locations in said combined word stream.

14. A process in accordance with claim 8, wherein:

said control words are placed in said combined word stream at control locations, said control locations include said periodic locations.

15. A process in accordance with claim 14, wherein:

boundaries of said data cells correspond to said control locations in said combined word stream.

16. A process in accordance with claim 15, wherein:

said encoding places an error detection code in said combined word stream to determine data integrity, said error detection code is placed in said control locations between said data cells in said combined word stream.

17. A process in accordance with claim 15, wherein:

said recombining of said data words back into respective said data cells detects when a control word is not in one of said control locations.

18. A process in accordance with claim 14, wherein:

said data words of one of said data cells and said control words of said one of said cells form a frame in said combined word stream;

said combining of data and control words forms a first type of frame and a second type of frame, said first type of frame having said periodic locations in different locations than said second type of frame, said combining placing said first and second types of frames in said combined word stream to properly align said periodic locations.

19. A process in accordance with claim 18, wherein:

each of said frames having a last location of a last word in said frame, said first type of frame has said last location as one of said periodic locations, said second type of frame has said last location as not being one of said periodic locations.

20. A process in accordance with claim 1, wherein:

said creating, said combining, said converting of said parallel bits, and said transmitting being performed by said one ATM card;

said converting of said serial stream of bits and said recombining is performed by said another ATM card.

21. A process in accordance with claim 1, wherein:

said continuous stream of data is received in an Atlanta chip set interface format.

22. A process in accordance with claim 1, wherein:

said Atlanta chip set interface format includes 8 bits of data, one bit of parity and one Start-of-Cell indication.

23. A process in accordance with claim 1, wherein:

said converting of said plurality of parallel bits and said converting of said serial stream of bits is performed according to an operation of serializer-deserializer chip sets manufactured by AMC as part #S2052.

* * * * *